United States Patent [19]

Chappell

[11] Patent Number: 5,293,294
[45] Date of Patent: Mar. 8, 1994

[54] SHUTTER FOR DISK-BASED MEMORY MEDIUM HOUSING AND METHOD OF FABRICATION

[75] Inventor: Gregory E. Chappell, Charlotte, N.C.

[73] Assignee: Verbatim Corporation, Charlotte, N.C.

[21] Appl. No.: 909,973

[22] Filed: Jul. 7, 1992

[51] Int. Cl.⁵ .................................... G11B 23/033
[52] U.S. Cl. .................................... 360/133; 369/291
[58] Field of Search .......................... 360/133; 369/291

[56] References Cited

U.S. PATENT DOCUMENTS

| | | | |
|---|---|---|---|
| 4,992,896 | 2/1991 | Inoue et al. | 360/99.06 |
| 5,021,913 | 6/1991 | Overland et al. | 360/133 |
| 5,043,974 | 8/1991 | Nakagawa | 369/291 |
| 5,140,490 | 8/1992 | Fujita et al. | 369/291 X |

FOREIGN PATENT DOCUMENTS 61-74187  4/1986  Japan .................................... 360/133

*Primary Examiner*—John H. Wolff
*Attorney, Agent, or Firm*—Albert C. Smith

[57] ABSTRACT

A shutter for use on a housing of a disk-based memory medium is formed of aluminum alloy sheet stock that is bent to form a spine with integral side legs or aprons. A surface-hardening coating is formed on both legs near the spine to increase the wear resistance of the shutter in the area where the shutter engages a shutter-opening mechanism that tends to introduce plastic deformation and metal debris after repeated contacts with the shutter-opening mechanism. The method for fabrication of the shutter includes stamping a slot in the sheet stock at a location which will form an edge of the shutter where plastic deformation occurs. A surface-hardening coating is formed on all exposed areas of the shutter, including the edge of the stamped slot. The shutter is trimmed and punched to its final size, and the shutter is bent to form a spine and a pair of legs, with the edges of the slots forming a wear-resistant edge on each leg near the spine.

9 Claims, 4 Drawing Sheets

SHUTTER FOR DISK-BASED MEMORY MEDIUM HOUSING AND METHOD OF FABRICATION

BACKGROUND OF THE INVENTION

1. Field of the Invention

This invention relates to a shutter for the head access window in the housing for a disk-based memory medium, and more specifically to a surface hardening coating and method for forming such coating on an edge of the shutter.

2. Description of the Prior Art

Shutters are employed over the head access window in the housings of data storage devices which include, but are not limited to "computer microdisks" and "optical disks" (as certain of such storage devices are referred to in the industry) that are used in a wide range of computers and audio/visual devices. The disc-shaped memory medium may include magnetic or optical materials, and is contained within a protective outer shell or housing that includes a head access window and a protective shutter over the window. The housing is configured to slide into a disk drive which comprises a mechanism for opening the shutter and a transducer (the drive head) for reading and/or writing to the disk based memory medium. The mechanism for opening the shutter typically includes a steel pin that is arranged to engage the edge of both legs of the shutter to open the head access window against resilient bias of the shutter toward normally-closed position. The shutter is slidably mounted over the head access window in the housing to protect the disk-shaped memory medium from dust and foreign objects that would otherwise enter through the head access window in the housing. When the housing with the memory medium therein is inserted into the disk drive, the shutter is engaged by a mechanism that slides the shutter to open the head access window and expose the memory medium to a read and/or write transducer. The action of the shutter-opening pin involves an initial impact followed by a pushing and sliding motion on an edge of the shutter to overcome the resilient bias that retains the shutter in normally closed position.

The shutters are commonly formed of stainless steel, which is adequately resistant to wear from contact with the shutter-opening mechanism, but more expensive to use than softer, lower cost metals such as aluminum alloys. However, shutters formed of aluminum alloys commonly deform and abrade at the point of contact with the shutter-opening mechanism after repeated insertions into the disk drive, thereby releasing metal debris. In addition, the deformed shutter abrades the housing which is commonly formed of plastic, thereby releasing plastic debris. The metal and plastic debris will collect on the housing and can contaminate the disk-shaped memory medium contained within the housing to defeat the purpose of the protective housing and shutter.

SUMMARY OF THE INVENTION

According to the present invention, a shutter for the head access window in the housing for a disk-based memory medium is stamped from an aluminum alloy on which is selectively formed a wear-resistant, lubricious, surface-hardening coating at least on the edge of the shutter that engages a shutter-opening mechanism of a disk drive.

The shutter and the method for making it according to the present invention are based upon forming a surface-hardening coating on the edge of the shutter that contacts the opening mechanism to significantly increase the wear resistance, surface hardness and lubricious properties of the contact surface.

DESCRIPTION OF THE PREFERRED EMBODIMENTS

Figure 1:
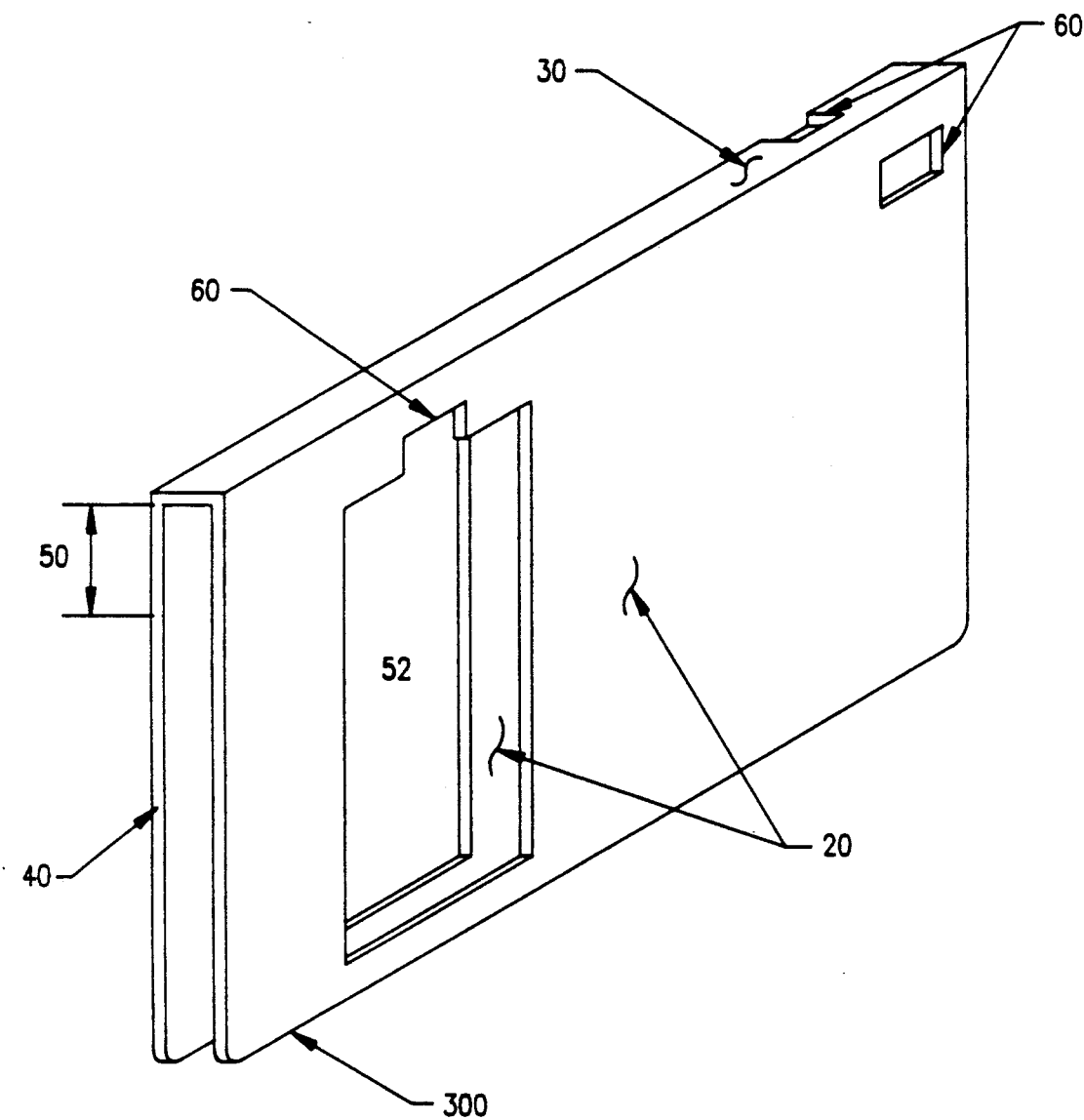
FIG. 1 is a perspective view of the shutter showing the integral spine and descending aprons or legs along opposite side edges of the spine.
Figure 2:
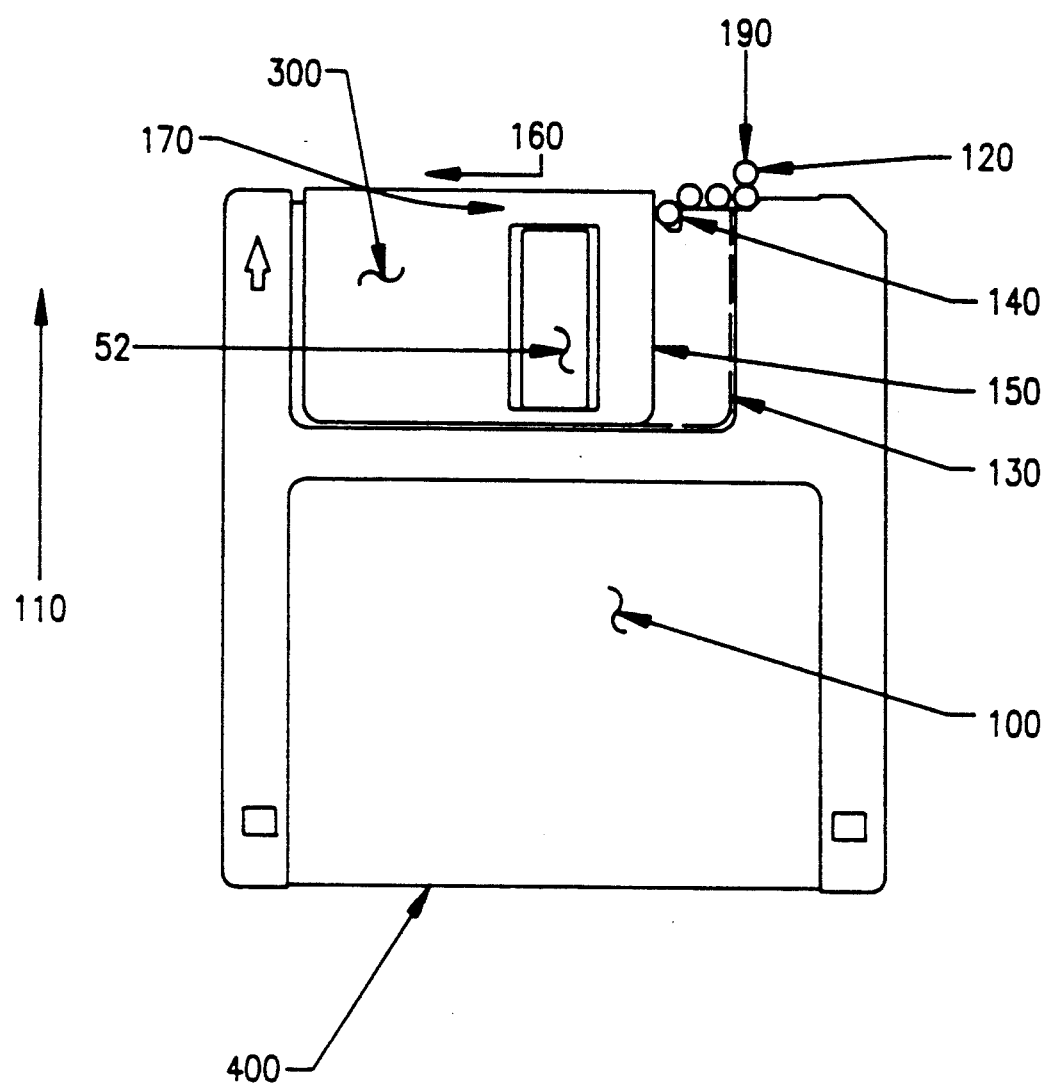
FIG. 2 is a pictorial diagram showing the shutter on a disk housing and the path followed by an engaging pin of a shutter-opening mechanism.

Referring now to the perspective view of FIG. 1 and the pictorial diagram of FIG. 2, there are shown a shutter 300 of conventional design for operation on a housing 400 of a data storage disk and including a spine 30 and integral aprons or legs 20 spaced along opposite edges of the spine 30. The description herein refers to a substantially symmetrical shutter 300, i.e., having legs 20 of equal length, for simplicity of explanation. The shutter 300 includes an aperture 52 in each leg or apron 20, and various tabs 60 for retaining the shutter 300 captive in grooves within a housing and for attachment thereto of a spring, all in conventional manner. For simplicity of explanation, the description herein refers to a shutter 300 formed of aluminum alloy that is anodized on major surfaces as well as along the portions 50 of the edges 40 that come into contact with a shutter-opening mechanism 190 (in FIG. 2) of a disk drive. The anodized aluminum alloy surfaces significantly inhibit plastic deformation of the metal and resulting debris formation. As illustrated in FIG. 2, the shutter 300 is slideably mounted on a housing 400 for movement along a lateral path in response to a shutter-opening mechanism 190 of a disk drive. Arrow 110 indicates the direction of insertion of the housing 400 into a disk drive. The shutter 300 slides from an initial, normally-closed position 130 to a final, open position 150 in direction indicated by arrow 160 as the shutter-opening mechanism 190 travels from initial position 120 to final position 140. Arrow 170 indicates the area 50 on the shutter 300 (in FIG. 1) where the plastic deformation of the edge 40 occurs due to repeated insertions and contacts with the pin of shutter-opening mechanism 190.

Figure 3:
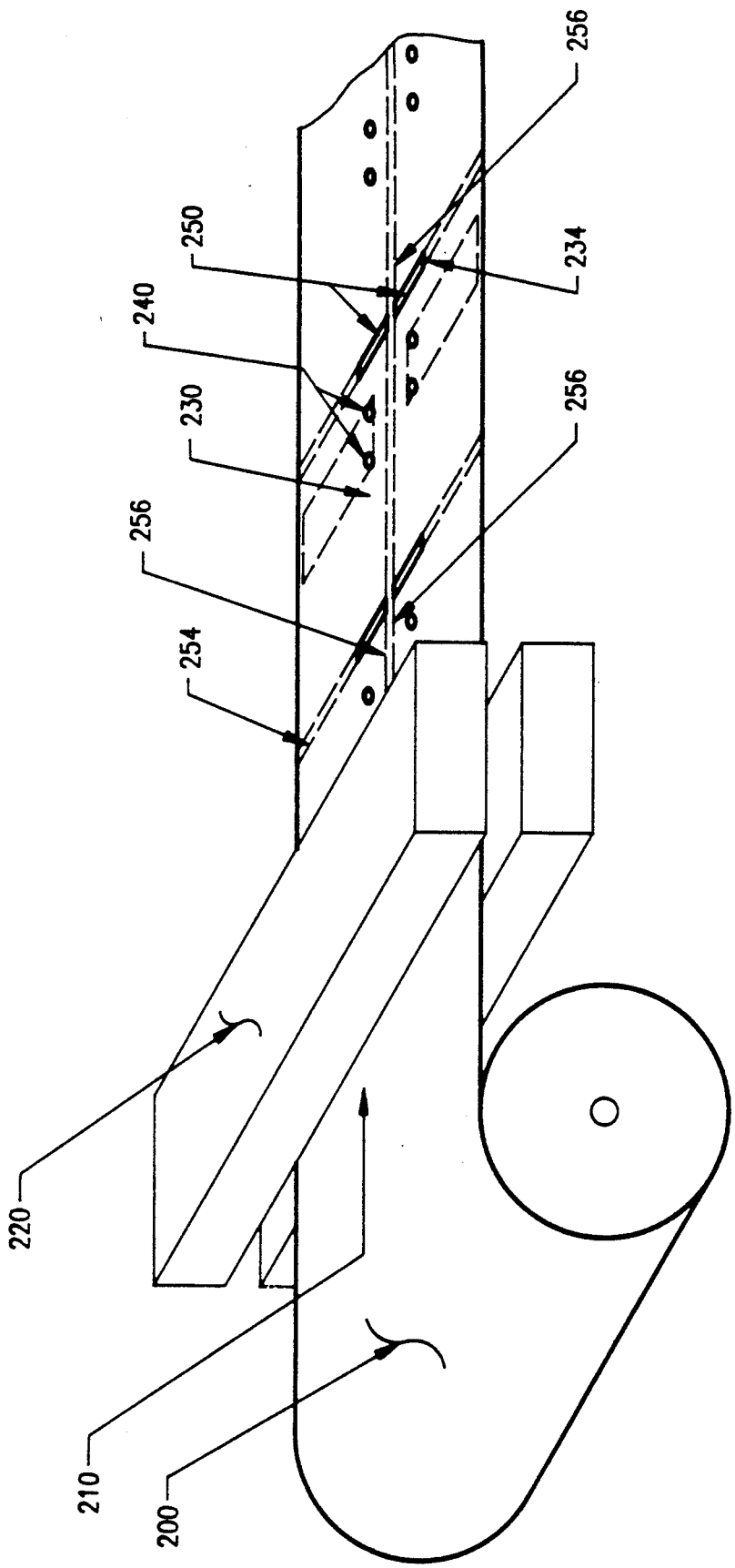
FIG. 3 is a pictorial diagram showing a coil of sheet metal, and a stamping tool for pre-punching slots and pilot holes in the sheet stock.

Referring now to the pictorial diagram of FIG. 3, the coil 200 of aluminum alloy sheet stock supplies aluminum alloy sheet material of approximately 0.008 inch thickness in the direction indicated by arrow 210 through a pre-punch tooling 220 which punches a pair of spaced slots 250 in the aluminum sheet material at repeated locations therealong which will subsequently become the areas 50 of the shutters 300 that will contact the shutter opening mechanism 190. Additional apertures or pilot holes 240 used to register the location of a shutter blank 230 in a second punch and forming tool of conventional design (not shown) may also be formed by the pre-punch tooling. Of course, many shutter blanks may be pre-punched simultaneously in orientations across the width and along the length of the sheet stock from roll 200. The aluminum alloy sheet stock is then anodized in conventional manner to produce an anodized coating on all exposed surfaces including the edges in slots 250 that will form the edges 50 of the shutter 300. Such anodized aluminum coating may be formed to a thickness of about 0.000150 inches in known manner using conventional equipment. Then, the anodized aluminum sheet is fed through a second punching and forming tool (not shown) of conventional design with a pair of slots 250 positioned with the trailing edges thereof (relative to the movement of the sheet stock in the direction of arrow 210) aligned to become the forward edges of a shutter blank 230 when the sheet stock is later blanked or sheared along line 254 which represent the shutter perimeter. The spine 30 of the shutter 300 will then be formed, after anodizing the aluminum sheet stock, by bending along lines 256 in a shutter blank 230 that may be further trimmed, shaped and punched with apertures, tabs, and the like, in conventional manner.

Figure 4:
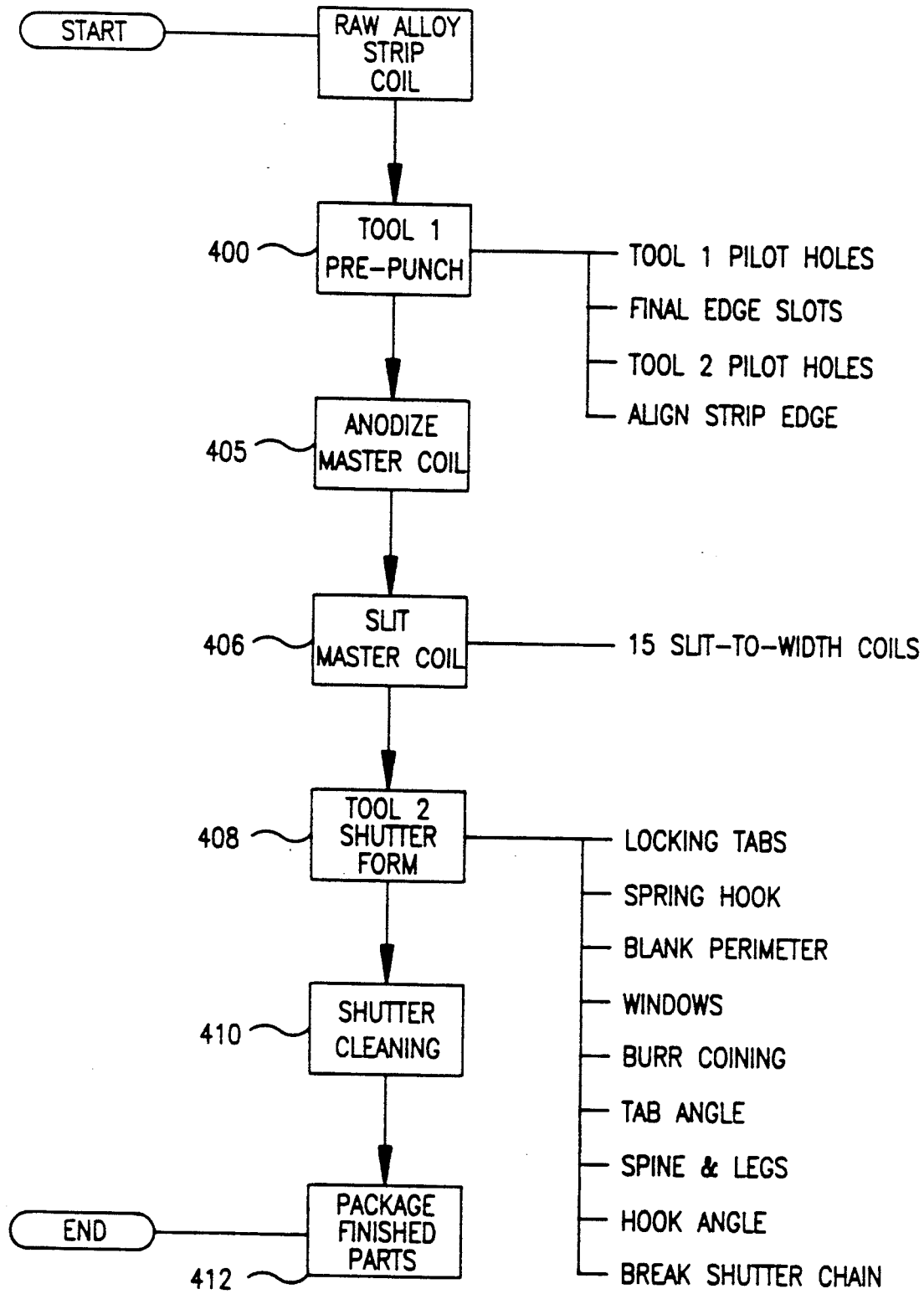
FIG. 4 is a flow diagram showing the sequence of assembly steps according to the present invention.

The method of fabrication according to the present invention is illustrated in the flow chart of FIG. 4. For simplicity of explanation, the description herein refers to a shutter 300 formed of aluminum alloy that is anodized on major surfaces as well as along the portions 50 of the edges 40 that come into contact with a shutter-opening mechanism 190 of a disk drive. In the stamping step 400, the aluminum sheet stock from coil 200 passes through the pre-punch or stamping tooling 220 which stamps the slots 250 that will form the edges 50 and pilot holes or registration apertures 240. Then, the aluminum sheet stock is anodized 405 in conventional manner to produce a coating of aluminum oxide on all exposed surfaces and edges (including within slots 250) to a thickness of about 0.000150 inches. Individual shutter blanks 230 may then be trimmed and punched 408 to final size with all tabs and apertures in place. Specifically, a coil of the anodized and pre-punched aluminum alloy stock may be slit 406 to proper width (optional) and then passed through a second punching or stamping operation to form shutter blank outer perimeters, the mounting or locking tabs and spring tab 60, and the head access windows 52, all in conventional manner. Thereafter, the shutter blanks maybe bent 408 to form the spine 30 and legs 20, or aprons, as illustrated in FIG. 1, and the tab 60 on the spine 30 and legs 20 may be bent to suitable angles for attachment to a disk housing and for attachment of a normally-closing spring in conventional manner. The blanks may then be removed from the sheet stock as individual finished shutters by parting each blank at the ends of the spines that align along the length of the sheet stock. These individual shutters may be cleaned 410 then assembled 412 onto disk housings with normally-closing springs in conventional manner to provide the protective shutter on a disk housing, as illustrated in FIGS. 1 and 2.

I claim:

1. A shutter for a housing of a disk-based memory medium, comprising:
 a metal body of selected thickness including a spine having spaced ends and a pair of integral legs along spaced edges of the spine and having spaced ends substantially aligned with the spaced ends of the spine; and
 a surface-hardening coating at least on the thickness of an end of a leg in a region thereof near the spine to inhibit wear and deformation thereof.

2. The shutter of claim 1 wherein the surface-hardening coating is an anodic coating.

3. The shutter of claim 2 wherein the metal body is aluminum alloy and the anodic coating is aluminum oxide at least on the thickness of the spaced end of the legs in regions thereof near an end of the spine.

4. The shutter of claim 1 including a surface-hardening coating on the thickness of the spaced ends of the pair of legs in the regions thereof near the spine to inhibit wear and deformation thereof.

5. A method for fabricating a shutter from sheet rock metal of selected thickness for use on a housing of a disk-based memory medium, the method comprising the steps of:
 forming a slot with an edge at a selected location on the sheet rock;
 forming a surface-hardening coating on all exposed surfaces of the sheet rock including the thickness of the edge of the slot;
 trimming and punching the sheet stock to form the shutter with the edge of the slot disposed to form a portion of a spaced end of a leg integral with a spine; and
 bending the shutter to form the spine having spaced ends and a pair of integral legs along spaced edges of the spine and having spaced ends substantially aligned with the spaced ends of the spine, with the edge of the slot at the selected location disposed to form a portion of a spaced end of an integral leg in a region thereof near an end of the spine and having the surface-hardening coating thereon and being substantially aligned with an end of the spine.

6. The method of claim 5, wherein in the step of forming the surface-hardening coating, an anodizing process is applied to the sheet stock including the thickness of the edge of the slot.

7. The method of claim 5, wherein the sheet stock is aluminum alloy and the anodizing process forms a layer of aluminum oxide on the sheet stock and on the thickness of the edge of the slot.

8. A method for fabricating a shutter for a housing of a disk-based memory medium, the method comprising the steps of:
 forming a shutter of aluminum alloy of selected thickness having a spine and integral legs along edges of the spine between spaced ends thereof, and including an end of the leg of said selected thickness;
 forming a surface-hardening coating on the shutter, including on a portion of said end of selected thickness; and
 installing the shutter on a housing for sliding movement thereon in response to application of force to the shutter at said end of selected thickness.

9. The method according to claim 8, wherein the step of forming a surface-hardening coating includes forming layer of aluminum oxide on said end of selected thickness.

* * * * *